US006613839B1

(12) United States Patent
Gan et al.

(10) Patent No.: US 6,613,839 B1
(45) Date of Patent: *Sep. 2, 2003

(54) POLYEPOXIDE, CATALYST/CURE INHIBITOR COMPLEX AND ANHYDRIDE

(75) Inventors: Joseph Gan, Strasbourg (DE); John P. Everett, Buehl (DE)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,983

(22) Filed: Jan. 20, 1998

Related U.S. Application Data
(60) Provisional application No. 60/035,948, filed on Jan. 21, 1997.

(51) Int. Cl.[7] .......................... C08G 59/42; C08G 59/62; C08G 59/68; C08L 63/02; C08L 63/04
(52) U.S. Cl. ........................ 525/117; 525/118; 525/502; 525/508; 525/523; 525/530; 525/533; 528/88; 528/89; 528/90; 528/91; 528/93; 528/94; 528/112
(58) Field of Search .................. 525/117, 523, 525/118, 502, 508, 530, 533; 528/91, 88, 89, 90, 93, 94, 112

(56) References Cited

U.S. PATENT DOCUMENTS

| | | | |
|---|---|---|---|
| 2,633,458 A | 3/1953 | Shokal ...................... 260/45.2 |
| 3,048,552 A | 8/1962 | Fang ........................ 260/28.5 |
| 3,477,990 A | 11/1969 | Dante et al. .................... 260/47 |
| 3,732,332 A | * 5/1973 | Curtis, Jr. et al. ........... 525/117 |
| 3,738,862 A | 6/1973 | Klarquist et al. ............ 117/126 |
| 3,821,243 A | 6/1974 | Habermeier et al. ..... 260/309.5 |
| 3,907,719 A | 9/1975 | Habermeier et al. ...... 260/2 EC |
| 3,947,395 A | 3/1976 | Ogata et al. ............... 260/28 P |
| 3,975,397 A | 8/1976 | Habermeier et al. ..... 260/309.5 |
| 3,976,718 A | 8/1976 | Labana et al. ............... 260/836 |
| 3,997,499 A | 12/1976 | Heilman et al. |
| 4,071,477 A | 1/1978 | Seltzer et al. ............... 260/2 N |
| 4,167,539 A | 9/1979 | Heilman et al. ............. 525/117 |
| 4,318,766 A | 3/1982 | Smith ........................ 156/330 |
| 4,322,456 A | 3/1982 | Martin ....................... 427/195 |
| 4,410,596 A | 10/1983 | Whiteside, Jr. et al. ..... 428/413 |
| 4,438,254 A | 3/1984 | Doorakian et al. ........... 528/89 |
| 4,544,732 A | 10/1985 | Corley ........................ 528/90 |
| 4,554,342 A | 11/1985 | Corley ........................ 528/90 |
| 4,581,436 A | 4/1986 | Corley ........................ 528/90 |
| 4,594,291 A | 6/1986 | Bertram et al. ............. 428/414 |
| 4,631,306 A | 12/1986 | Markert et al. ............. 523/457 |
| 4,725,652 A | 2/1988 | Bertram et al. ............. 525/485 |
| 4,766,196 A | 8/1988 | Goel et al. .................... 528/89 |
| 4,873,273 A | 10/1989 | Allan et al. ................. 523/407 |
| 4,925,901 A | 5/1990 | Bertram et al. ............. 525/482 |
| 4,946,817 A | 8/1990 | Bertram et al. ............. 502/154 |
| 5,134,239 A | 7/1992 | Bertram et al. ............. 546/112 |
| 5,140,079 A | 8/1992 | Muskopf et al. ............ 525/482 |
| 5,169,473 A | 12/1992 | Bertram et al. ............. 525/523 |
| 5,314,720 A | 5/1994 | Gan et al. ................... 427/386 |
| 5,503,937 A | 4/1996 | Bertram et al. ............. 525/482 |
| 5,620,789 A | 4/1997 | Gan et al. ................... 156/330 |
| 5,721,323 A | 2/1998 | Schultz et al. .............. 525/504 |
| 5,821,305 A | * 10/1998 | Schutyser et al. .......... 525/112 |

FOREIGN PATENT DOCUMENTS

| | | |
|---|---|---|
| CA | 893191 | 2/1972 |
| EP | 0 328 020 | 8/1989 |
| EP | 0 365 479 | 4/1990 |
| EP | 413386 A * | 2/1991 |
| EP | 0 458 502 | 11/1991 |
| EP | 0 503 744 | 9/1992 |
| EP | 0 659 793 A1 | 12/1993 |
| GB | 963058 | 7/1964 |
| JP | 54-53200 | 4/1979 |
| JP | 56-30458 | 3/1981 |
| JP | S56-72045 | 6/1981 |
| JP | 59-78229 | 5/1984 |
| JP | 2-135214 * | 5/1990 |
| JP | 9-25349 * | 1/1997 |
| JP | 9-194610 * | 7/1997 |
| SU | 448742 * | 8/1975 |
| WO | WO 95/06075 | 3/1995 |
| WO | WO 95/12627 | 5/1995 |
| WO | 96/12751 | 5/1996 |
| WO | WO 96/12752 | 5/1996 |

OTHER PUBLICATIONS

Abstract for JP Patent 58138729, Aug. 1983.
James J. Harris et al., "Proposed Mechanism for the Curing of Epoxy Resins with Amine–Lewis Acid Complexes or Salts", Journal of Applied Polymer Science, vol. 10, pp. 523–534 (1966).
C. Gardner Swain et al., "Quantitative Correlation of Relative Rates. Comparison of Hydroxide Ion with Other Nucleophilic Reagents Toward Alkyl Halides, Esters, Epoxides and Acyl Halides", J. Am. Chem. Society, vol. 75, p. 141–147 (1953).

* cited by examiner

Primary Examiner—Robert E. L. Sellers

(57) ABSTRACT

An epoxy resin composition comprises a) a polyepoxide, b) a cure inhibitor of boric acid, a Lewis acid derivative of boron, an alkyl borane, a mineral acid having a nucleophilicity value "n" of greater than zero and less than 2.5, or an organic acid having a pKa value of 1 or more, a catalyst which can be complexed with the cure inhibitor, and c) more than 30 parts by weight per 100 parts by weight of polyepoxide of a cross-linker such as a polycarboxylic acid or anhydride including a copolymer of an ethylenically unsaturated anhydride and a vinyl compound, or a hydroxy-functional compound such as a copolymer of styrene and hydroxystyrene.

12 Claims, No Drawings

POLYEPOXIDE, CATALYST/CURE INHIBITOR COMPLEX AND ANHYDRIDE

This application claims the benefit of Provisional Application No. 60/035,948, filed Jan. 1, 1997.

BACKGROUND OF THE INVENTION

This invention relates to epoxy resin compositions containing compounds which inhibit the cure of the epoxy resins at lower temperatures and to latent catalyst compositions for curing epoxy resins. The invention further relates to compositions useful for curing epoxy resins which comprise cross-linkers for the epoxy resins and the inhibitor described above. The invention further relates to adhesives and coatings prepared from such inhibited resin compositions, and to materials coated with or encapsulated by such inhibited resin compositions. The invention further relates to laminates, prepregs, dielectric films, insulated and/or encapsulated materials for electrical devices such as motors and transformers and composites prepared from such inhibited resin compositions.

Epoxy resins are used in a variety of applications, such as powder coatings, in encapsulation of electrical components, in composites, in solution coatings, in prepregs and in laminates. Also related to electronics, is the use of epoxy as adhesives to adhere copper foil to circuit boards which may, or may not, be manufactured for an epoxy matrix. In many of these uses, it is desirable to partially cure the epoxy resin in a controllable manner, such that at a later time, when desired, the epoxy resin can be fully cured. Such partial curing proportionately reduces the gel time of the resin. In many uses it is desirable to contact a cross-linker with an epoxy resin in the presence of a catalyst for the reaction and have the formulation remain stable, that is uncured for a period of time. At present it is quite difficult to control the curing of an epoxy resin and retain the stability of a composition comprising an epoxy resin, a cross-linker and catalyst for the reaction of the epoxy resin with the cross-linker.

In some uses the epoxy resin, cross-linker, and catalyst are contacted in a solution and then applied as a coating on a substrate such as reinforcing fibers. In some cases, one or more solvents are used to reduce the viscosity of the formulations for better coating and impregnation performance. Often it is desirable to remove this solvent before significant curing takes place, otherwise the solvent may be entrapped in the cured epoxy resin. Entrapped solvent adversely affects the final properties of the cured resin. Solvent removal is facilitated by use of substrates having a thickness dimension in the order of less than 5 mm to provide solvent a relatively short migration path to the surface of the formulation from which the solvent may escape. Often, the solvent is removed by exposing the coated article to elevated temperatures. However, at such elevated temperatures the epoxy resin may begin to cure resulting in increased molecular weight and viscosity. Thus, the method chosen for removal of solvents may cause the solvent to be trapped.

What is also needed is a resin system having a sufficiently wide processing window in order that solvent may be removed by heating the resin to remove the solvent without trapping solvent within cured polymer. The inhibitor feature permits the preparation of prepregs and laminates of consistent good quality.

After the solvent has been removed, a glass cloth coated with the resin, cross-linker and catalyst may be partially cured by exposing it to temperatures at which curing occurs. Such a product is referred to as a prepreg. The prepregs may then be stacked to build-up thickness, or formed into a shape and exposed to subsequent elevated temperature conditions under which the cross-linker and resin completes the cure of the thermosetting resin. In general, this involves contacting the various components of a laminate at elevated temperatures under pressure, for a period of time sufficient for the epoxy resin to further cure. In this curing process the resin coating on the glass cloth flows under pressure and mixes with the coating on adjacent glass cloths thereby resulting in a fusing of the glass layers together by means of a matrix of the cured epoxy resin.

It is desirable that prepregs have predictable qualities which are less sensitive to variations of temperature and residence time of the oven. The thickness of the laminate can be better controlled with prepregs having consistent properties. High concentrations of multifunctional components such as styrene-maleic anhydride copolymers, multifunctional phenolic cross-linkers such as tetraphenol ethane, multifunctional phenolic novalac epoxy resins, and high viscosity of the resin system components may contribute to erratic behavior of the resin system and corresponding unpredictable prepreg production. Undesired physical qualities, or poor prepreg appearance may also result from solvent entrapment in the resin of high viscosity resin systems.

It is also desirable that the resin demonstrate sufficient thermal decomposition temperature in order that laminate properties will not be adversely affected by subsequent processing steps, for example, immersion in molten solder, and to provide consistent properties in high temperature operating environments as occur in automobile 'under the hood' applications. The temperature of the onset of thermal decomposition is a measurable property which is believed to reflect performance properties of a laminate in high temperature environments.

Manufacturers of prepregs and electrical laminates desire to increase production rates without capital investment for example, by increasing production rates on existing equipment. In order to facilitate faster processing the epoxy resin coated substrates must be exposed to higher temperatures, the epoxy resin compositions must contain higher levels of catalysts, or both. Unfortunately, both measures taken to increase production result in less control over the curing reaction. Thus the need exists to control the reaction of resin systems at higher temperatures and catalyst levels.

Laminates may be manufactured in a continuous process. In the continuous process the prepregs are contacted at much higher temperatures than in conventional laminate processing for shorter periods, for example, at temperatures in a range from 200 C to 230 C for 1 to 4 minutes. It is very difficult to achieve complete cure under such conditions. One potential solution to this is to add a larger amount of catalyst or accelerator to the epoxy resin. Unfortunately increasing amounts of catalyst may limit solvent removal without sufficient curing of the epoxy resin.

Several references disclose curable epoxy resin compositions which include as a catalyst a salt of fluoroboric acid, (tetrafluoroborate, fluoroboric acid, and hydrofluoroboric acid), and fluoroborates. GB 963,058 discloses amine salts of hydrofluoroboric acid. U.S. Pat. No. 4,438,254 discloses phosphonium salts of tetrafluoroborate. U.S. Pat. No. 3,048,552 discloses a quaternary ammonium fluoroborate salt. "Proposed Mechanism for the Curing of Epoxy Resins with Amine-Lewis Acid Complexes or Salts" by James J. Harris and Samuel C. Temin, J. Ap. Pol. Sc., Vol. 10, pp. 523–534 (1966) discloses fluoroborate salts of aliphatic and aromatic amines and pyridine. Several patents disclose that onium salts of tetrafluoroborate (fluoroboric acid) are useful as accelerators in epoxy resin curing reactions. U.S. Pat. Nos. 4,318,766; 4,322,456; 4,410,596; 4,544,732; 4,554,342; 4,581,436; 4,766,196;, and CA-A-893,191.

Japanese 58/138729 discloses thermosetting molding compositions whose essential components are a resin component consisting of (a) epoxy resin, (b) an alkenylphenol polymer, and (c) a latent curing accelerator together with (d) fibers and/or granular fillers, wherein the alkenylphenol polymer is dispersed and mixed as a powder in the epoxy resin along with the fillers. It discloses as the latent curing accelerator tetra-substituted boron salts of ammonium compounds, phosphonium compounds, arsonium compounds, imidazolium compounds, pyridinium compounds, or morpholinium compounds. Only tetraphenyl or tetrabutyl borate salts are believed to be disclosed.

U.S. Pat. No. 3,947,395 discloses surface coating compositions consisting essentially of (a) coal tar and/or asphalt, (b) an epoxy resin and (c) at least one of tetra-substituted boron salts of onium ions and tetra-substituted boron salts of imidazolium ions, which are suitable for coating the surface of concrete, asphalt or metal. The patent is believed to only disclose tetraphenyl or tetra(substituted phenyl) boron salts.

U.S. Pat. No. 4,631,306 discloses a method of manufacturing an insulating component made from a mixture of polyepoxide and a polyisocyanate. Disclosed is the use of latent catalysts which are the addition complexes of boron trihalogenides with tertiary amines and imidazoles.

U.S. Pat. No. 3,738,862 discloses a process for preparing epoxy resin laminates and accelerator compositions useful in such a process. Suitable accelerators (catalysts) disclosed include the stannous salts of monocarboxylic acids, lithium benzoate, certain heterocyclic compounds such as the imidazole and benzimidazole compounds and salts thereof, tertiary amine borates, and tertiary amines among others. Suitable tertiary amine borates can be prepared by reacting at room temperature a tertiary amine with a borate such as, for example, methyl borate or triethyl borate. Suitable tertiary amine borates include, among others, trimethylamine borate, triethylamine borate, triethanolamine borate, triisopropanolamine borate, benzyldimethylamine borate, alpha-methylbenzyl, dimethylamine borate, dimethylaminomethyl phenol borate, and tridimethyl aminomethyl phenol borate. Particularly preferred is triethanolamine borate.

U.S. Pat. No. 4,725,652 discloses latent catalysts for epoxy reactions prepared by reacting a tetra-substituted onium compound such as tetra-butylphosphonium acetate-acetic acid complex or an amine compound with an acid having a weak nucleophilic anion such as fluoroboric acid. These catalysts provide stable latent catalysts for epoxy resins for advancement or curing reactions.

WO-A-95/06075 relates to interpenetrating polymer networks including epoxy resins and allyl network forming compounds. The allyl network is proposed to be formed by initiated polymerization of allyl monomers such as triallyl cyanurate. Electrical laminates prepared from such polymers manufactured in the customary manner are claimed to demonstrate a $T_g$ of 190° C.

U.S. Pat. No. 5,314,720 relates to formulations which contain epoxy resin, boric acid, cross-linker from 0.5 to 30 parts per hundred parts resin (phr), and catalyst. EP-A-0729484 relates to formulations which contain epoxy resin, cross-linker, and from 0.01 to 2 phr boric acid. These resin systems provide suitable epoxy resin systems for prepregs and laminates for electronic circuits.

The above-described useful latent catalyst systems provide little advantage with respect to some properties of interest in electronic applications. The dielectric constant is of interest to the end-user for applications seeking ever-increased performance of microcircuits by increased signal speed of electronic devices mounted on circuit boards. In addition, while improved dielectric constant is obtained, it is important to increase performance with respect to this parameter without sacrificing other important performance properties such as glass transition temperature, $T_g$.

What is needed is an epoxy resin composition that may be used in existing manufacturing equipment for the manufacture of prepregs for printed circuit boards, without significant change of existing manufacturing equipment for the manufacture of printed circuit boards, but giving decreased dielectric constant without sacrifice of the important parameter $T_g$. What is further needed is a resin system which is free from aggressive solvents which permit the use of reinforcing substrates other than glass fibers, for example, aramid reinforcements such as those marketed by DuPont under the trademark THERMOUNT™.

Frequently, for many products prepared using epoxy resins and cured epoxy resins several different entities may perform different parts of the manufacturing process. For example, one entity may make the resin, a second entity may make the resin formulations used to impregnate the reinforcing material, and a third may make a prepreg, or other article to be used. While a fourth would make the final product such as a laminate or printed circuit board. Frequently the entity producing the prepreg or laminate has no expertise or desire to make the formulation. Therefore, it is desirable that a formulator be able to make a composition useful in coating the materials to be laminated. The problem is that if the epoxy resin cross-linker and catalyst are pre-formulated, the formulation may not have significant long-term storage stability. Under such circumstances the formulation may undergo curing and therefore not be useful to the prepreg or laminate manufacturer. What is further needed is an epoxy resin composition containing a cross-linker and accelerator for the cure which has significant stability at ambient temperatures for several weeks.

Further, different end users have different processing equipment and methods for applying the epoxy resin coatings. Such processing differences requite that the end-user may have means to adjust the resin properties to fit the processing equipment and the processing know-how of the end-user. Properties which end-users need to influence include the overall gel time of the resin solution as a varnish, and the gel time remaining after the impregnated resin is partially cross-linked, or "B-staged".

SUMMARY OF THE INVENTION

The present invention is based on the realization that a certain class of compounds inhibits the reaction of a polyepoxide with a cross-linker in the presence of a catalyst for the curing reaction at low temperatures.

The present invention provides an epoxy resin composition comprising:

a ) a polyepoxide,
b) a cure inhibitor which is boric acid, a Lewis acid derivative of boron such as an alkyl borate, an alkyl borane, a mineral acid having a nucleophilicity value "n" of greater than zero and less than 2.5 for example perchloric acid, tetrafluoboric acid, or an organic acid having a pKa value of 1 or more, but not more than 3, or a mixture of two or more thereof, and c) more than thirty parts per 100 parts polyepoxide of at least one cross-linker where the said at least one cross-linker includes an anhydride of a polycarboxylic acid, or a copolymer of an optionally substituted styrene and an optionally substituted hydroxystyrene.

In a preferred embodiment, the present invention provides such an epoxy resin composition which also comprises:

d) a bifunctional chain extender compound capable of reacting with a polyepoxide at elevated temperatures and, e) optionally, a catalytic amount of catalyst for accelerating the reaction of the polyepoxide with the cross-linker and/or the bifunctional chain extender.

In still another embodiment the present invention relates to a composition useful for curing a polyepoxide which comprises:

a) a cross-linker which is an anhydride of a polycarboxylic acid, a copolymer of styrene or hydroxystyrene, or a mixture thereof, capable of curing with a polyepoxide at elevated temperatures; and b) a cure inhibitor comprising boric acid, Lewis acid derivatives of boron such as alkyl borate, alkyl borane, trimethoxyboroxine, a mineral acid having a nucleophilicity value "n" of greater than zero and less than 2.5 such as perchloric acid, tetrafluoboric acid, and organic acids having a pKa value of 1 or more, but not more than 3 such as salicylic acid, oxalic acid, and maleic acid, and mixtures thereof; and c) optionally a bifunctional chain extender compound capable of reacting with a polyepoxide at elevated temperatures, d) optionally, a catalytic amount of a catalyst for accelerating the reaction of the polyepoxide with the cross-linker and/or the bifunctional chain extender, and e) optionally a hydroxy-functional cross-linker having a functionality of 2.2, or more.

In still another embodiment, the present invention relates to a process for coating an article with an epoxy resin composition comprising contacting an article with an epoxy resin which comprises:

a) a polyepoxide;

b) a cure inhibitor comprising boric acid, Lewis acid derivatives of boron such as alkyl borate, alkyl borane, trimethoxyboroxine, a mineral acid having a nucleophilicity value "n" of greater than zero and less than 2.5 such as perchloric acid, tetrafluoboric acid, and organic acids having a pKa value of 1 or more, but not more than 3 such as salicylic acid, oxalic acid, and maleic acid, and mixtures thereof;

c) a cross-linker selected from an anhydride of a polycarboxylic acid, and a copolymer of styrene and hydroxystyrene, or both, capable of curing with a polyepoxide at elevated temperatures;

d) optionally, a catalytic amount of a catalyst for accelerating the reaction of the polyepoxide with the cross-linker and/or the bifunctional chain extender;

e) optionally, a bifunctional chain extender compound capable of reacting with a polyepoxide at elevated temperatures;

f) optionally a hydroxy-functional cross-linker having a functionality of 2.2, or more;

g) optionally, passing the coated article through a heated zone at a temperature sufficient to cause any solvent present to evaporate but below the temperature at which the polyepoxide undergoes significant curing; and h) optionally, exposing-the coated article to conditions such that the polyepoxide undergoes at least partial curing.

In another embodiment, the present invention comprises a partially cured reaction product of a polyepoxide and a cross-linker wherein such partial cure occurs in the presence of a catalyst for the reaction of the cross-linker with a polyepoxide, and a cure inhibitor comprising boric acid or Lewis acids of boron derivatives such as alkyl borate, alkyl borane, trimethoxyboroxine, a mineral acid having a nucleophilicity value "n" of greater than zero and less than 2.5, such as, perchloric acid, tetrafluoboric acid, and organic acids having a pKa from 1 to 3 such as salicylic acid, oxalic acid, maleic acid, and mixtures thereof. Such partially cured product can thereafter be used for the known applications of epoxy resins, such as coatings, laminates, composites, encapsulating agents, and adhesives, by contacting the partially cured product with the appropriate substrate, or reinforcing material, and fully curing the composition. The processes for obtaining such a partially cured product are well-known in the art. In particular, the components are contacted under conditions such that the cross-linker and polyepoxide undergo partial reaction. In some embodiments the reactive ingredients are partially cured on the surface of a substrate.

In another embodiment, the cross-linker is contacted with a composition comprising a cure inhibitor comprising boric acid or Lewis acid derivatives of boron such as alkyl borate, alkyl borane, trimethoxyboroxine, a mineral acid having a nucleophilicity value "n" of greater than zero and less than 2.5, such as perchloric acid, tetrafluoboric acid, and organic acids having a pKa from 1 to 3 such as salicylic acid, oxalic acid, maleic acid, and mixtures thereof, and, optionally, a catalyst for the cure of a polyepoxide by the cross-linker. This composition is at some time thereafter contacted with polyepoxide, and subjected to curing conditions.

DETAILED DESCRIPTION OF THE PREFERRED EMBODIMENTS

The present invention described and claimed has several advantages for the manufacture of electrical laminates: the compositions comprising a polyepoxide, a cross-linker, a catalyst, an anhydride of a polycarboxylic acid, a hydroxyl-containing compound, or both, and inhibitor can be exposed to temperatures at which any solvent present is removed by evaporation without significant curing of the epoxy resin. Further opportunities for improved laminate products and processing improvements result from a faster curing speed in laminated manufacturing processes, elimination of the need for a 'post-bake' step, an improved processing window, slower melt-viscosity build-up during B-staging which benefits wet-out of the fiber substrate by the resin system, improved heat resistance, elimination of aggressive solvents, and inherent lower dielectric constant ($D_k$) and inherent lower dielectric loss factor ($D_f$) of the resin system. Furthermore in the presence of the inhibitor, the concentration of catalyst present may be significantly higher without resulting in cure of the epoxy resin composition during a solvent removal process. In addition to faster production through-put, a higher cross-link density may be achieved by using a larger concentration of catalyst. The final products prepared from these epoxy resin compositions may therefore exhibit an improved thermal performance as indicated by higher glass transition temperature and higher onset of thermal decomposition of the epoxy resin matrix when compared with compositions omitting the required cross-linker.

The resin composition (with or without the presence of solvents) may take advantage of the low $D_k$ and $D_f$ properties of the claimed epoxy resin for encapsulation of electrical components in, or on, composite laminate circuit boards, or for construction of composite articles such as an aircraft radome where low $D_k$ and $D_f$ is an advantage.

Those resin compositions which contain a polyepoxide, cross-linker, catalyst, an anhydride of a polycarboxylic acid, or hydroxyl-containing compounds and inhibitor, have a significantly longer shelf life at ambient temperatures. The compositions of this invention may be processed at faster speeds as a higher concentration of accelerator may be used in processing. The compositions may also be processed at high temperatures without adversely affecting the final product properties, for example, in the continuous pressing process. Further, by adjusting the level of catalyst and inhibitor, the gel time of a resin can be controllably adjusted. And still further, compositions of this invention exhibit a lower dielectric constant without material sacrifice in important properties such as $T_g$.

The manner of combination of the ingredients of the inventive resin composition may occur in a variety of sequences and means, each of which may provide apparent advantages to the end user. For example: 1) The inhibitor, an anhydride of a polycarboxylic acid, a polyhydroxide compound, or both, and catalyst could be contacted with the polyepoxide separately. 2) The inhibitor, and catalyst could be combined so as to form a complex; thereafter, the complex could be combined with the polyepoxide. The latent catalyst complex can be used in any embodiment described herein where both inhibitor and catalyst are simultaneously present. 3) A polyepoxide, a cross-linker for the polyepoxide, an anhydride of a polycarboxylic acid, and an inhibitor comprising boric acid may optionally be in a mixture with Lewis acid derivatives of boron such as alkyl borate, alkyl borane, trimethoxyboroxine, an acid having a weak nucleophilic anion, such as perchloric acid, tetrafluoboric acid, and organic acids having a pKa from 1 to 3 such as salicylic acid, oxalic acid, and maleic acid. The catalyst useful for reacting the polyepoxide with the cross-linker could be added to the composition and thereafter the composition could be used in any use of polyepoxide, known to those skilled in the art. 4) A polyepoxide could be combined with a cross-linker, an anhydride of a polycarboxylic acid, an inhibitor. Such a composition is stable at ambient temperatures for up to two weeks. Such a composition exhibits no significant change in gel time at 150 C and 170 C over a period of 5 days, more preferably 10 days and most preferably 15 days. At the time of use, the mixture is combined with a pre-complexed catalyst as described.

The compositions described herein may be found in various forms. In particular the various compositions described may be found in powder form, or alternatively in solution or dispersion. In those embodiments where the various compositions are in solution or dispersion, the various components of the composition may be separately dissolved in a solvent suitable for that component, then the various solutions are combined and intimately mixed. Note the solvents for the various components are preferably chosen such that the solvents are miscible with one another. Intimately mixed as used herein refers to agitating a mixture of solutions which is a relatively homogeneous solution or dispersion. Alternatively, the components .may be dissolved or dispersed in the same solvent or dispersant. In those embodiments wherein the compositions are partially cured or advanced, the compositions of this invention may be found in a powder form, solution form, or coated on a particular substrate.

Polyepoxide as used herein refers to a compound or mixture of compounds containing more than one epoxy moiety. Polyepoxide as used herein includes partially advanced epoxy resins that is, the reaction of a polyepoxide and a chain extender, wherein the reaction product has, on average, more than one unreacted epoxy unit per molecule.

Aliphatic polyepoxides may be prepared from the known reaction of epihalohydrins and polyglycols. Other specific examples of aliphatic epoxides include trimethylpropane epoxide, and diglycidyl-1,2-cyclohexane dicarboxylate. Preferable compounds which can be employed herein include, epoxy resins such as, for example, the glycidyl ethers of polyhydric phenols, that is, compounds having an average of more than one aromatic hydroxyl group per molecule such as, for example, dihydroxy phenols, biphenols, bisphenols, halogenated biphenols, halogenated bisphenols, alkylated biphenols alkylated bisphenols, trisphenols, phenol-aldehyde novolac resins, substituted phenol-aldehyde novolac resins, phenol-hydrocarbon resins, substituted phenol-hydrocarbon resins and any combination thereof.

Polyepoxides (polyglycidyl ethers of a polyhydroxy hydrocarbon) may be prepared by reacting an epihalohydrin with a polyhydroxy hydrocarbon or a halogenated polyhydroxy hydrocarbon. The preparation of such compounds is well known in the art. See Kirk-Othmer Encyclopedia of Chemical Technology 3rd Ed. Vol. 9 pp 267–289.

The epihalohydrins correspond to Formula 1

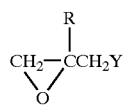

1 wherein Y is a halogen, preferably chlorine or bromine, and most preferably chloro; R is hydrogen, or $C_{1-4}$ alkyl, and more preferably methyl.

Polyhydroxy hydrocarbon means a compound with a hydrocarbon backbone and on average more than one primary or secondary hydroxy moieties, preferably two or more. Halogenated polyhydroxy hydrocarbon means a compound with a hydrocarbon backbone which is substituted with one or more halogens and more than one, preferably two or more, primary or secondary hydroxy moieties. The hydroxyl moieties may be aromatic aliphatic or cycloaliphatic.

Among even more preferred classes of polyhydroxy hydrocarbons and halogenated polyhydroxy hydrocarbons are the dihydroxy phenols; biphenols; bisphenols; halogenated bisphenols; alkylated bisphenols; trisphenols; hydrogenated bisphenols; novolac resins, that is, the reaction product of phenols, including halogenated and alkylated phenols, and simple aldehydes, preferably formaldehyde and hydroxybenzaldehyde; and polyalkylene glycols.

Preferred polyhydroxy hydrocarbons, and halogenated polyhydroxy hydrocarbons include those corresponding to Formulas 2 to 5:

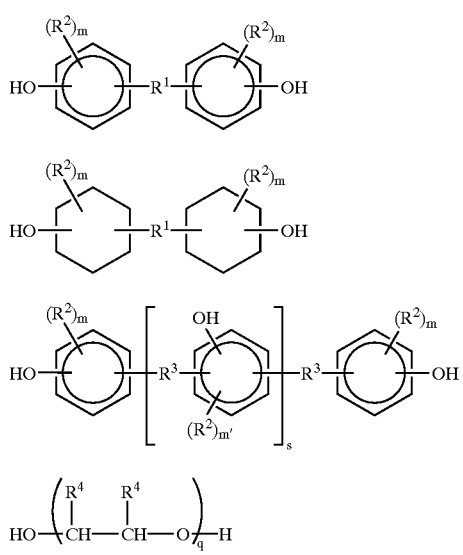

2

3

4

5 wherein:

R¹ is separately in each occurrence $C_{1-}$ alkylene, $C_{1-10}$ haloalkylene, $C_{4-10}$ cycloalkylene, carbonyl, sulfonyl, sulfinyl, oxygen, sulfur, a direct bond or a moiety corresponding to the formula

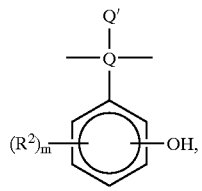

R² is separately in each occurrence $C_{1-3}$ alkyl or a halogen;

R³ is separately in each occurrence $C_{1-10}$ alkylene or $C_{5-50}$ cycloalkylene;

R⁴ is separately in each occurrence hydrogen, methyl, halomethyl, or ethyl, with the proviso that only one R⁴ on an ethylene unit can be methyl, halomethyl or ethyl;

Q is separately in each occurrence a $C_{1-10}$ hydrocarbyl moiety;

Q' is separately in each occurrence hydrogen, cyano, or a $C_{1-14}$ alkyl group;

m is independently in each occurrence from 0 to 4;

m' is separately in each occurrence from 0 to 3;

q is from 1 to 80; and s is from 0 to 10.

R¹ is preferably $C_{1-3}$ alkylene, $C_{1-3}$ haloalkylene, carbonyl, sulfur, or a direct bond. R¹ is more preferably a direct bond, $C_{1-3}$ alkylene, or fluorinated propylene (=C(CF₃)₂). R¹ is most preferably propylene. R² is preferably methyl, bromine or chlorine; and most preferably methyl or bromine. R³ is preferably $C_{1-3}$ alkylene or polycyclic moiety corresponding to the formula

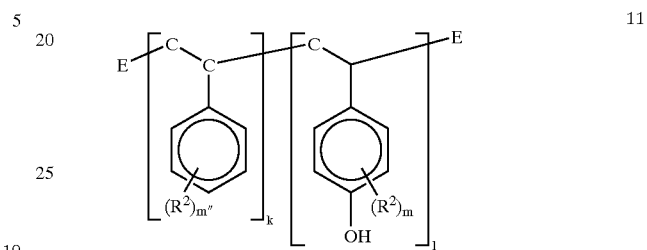

wherein t is from 1 to 6, preferably from 1 to 3, most preferably 1. Preferably, m' is from 0 to 2. Preferably, m is from 0 to 2. Preferably, q is from 2 to 40, more preferably from 2 to 20 and most preferably from 5 to 15. Cycloalkylene as used herein refers to monocyclic and polycyclic hydrocarbon moieties.

Another class of hydroxyl-containing compounds which is advantageous for electrical laminate applications are copolymers of styrene and hydroxystyrene according to the schematic Formula 11, (where the general formula does not suggest any particular ordering of the monomer units)

11

E is a suitable chain terminating group, the sum of k+l is from 3 to 10,000, and the ratio of k to l is from 1:1 to 50:1, m" is from 0 to 5, and R² and m are as previously defined.

The most preferred class of polyhydroxy hydrocarbons are the dihydroxy phenols including those which contain substituents that are non-reactive with the phenolic groups. Illustrative of such phenols are 2,2-bis(3,5-dibromo-4-hydroxyphenyl) propane; 2,2-bis(4-hydroxyphenyl) propane; 2,2-bis(3,5-dichloro-4-hydroxyphenyl) propane; bis (4-hydroxyphenyl) methane; 1,1-bis(4-hydroxyphenyl)-1-phenyl ethane; 1,1'-bis(2,6-dibromo-3,5-dimethyl-4 hydroxyphenyl) propane; bis(4-hydroxyphenyl) sulfone; bis (4-hydroxyphenyl) sulfide; resorcinol and hydroquinone. Preferred dihydroxy phenolic compounds are 2,2-bis(4-hydroxyphenyl) propane (bisphenol A), trimethylolprbpane, 1,3,5-tris-(2-hydroxyethyl)-1,3,5-triazin-2,4,6(1H,3H,5H)-trion, and 2,2-bis(4-hydroxy-3,5-dibromophenyl) propane.

As the dihydroxy phenols supply two equivalents of hydroxyl moiety per molecule, reaction of these species with an excess of molecules having polyepoxide-functionality results in "extension" of the molecular chain and corresponding variance of the resin properties as a result from the increased average molecular weight of the resin. The dihydroxy phenols serve as bifunctional chain extenders according to the claims. When present, the bifunctional chain extender may beneficially comprise up to 0.5 equivalents of epoxy functionality originally present in the resin, preferably, the chain extender is present from 0 to 0.4 equivalents per equivalent of epoxy functionality originally present in the resin.

As used herein haloalkyl refers to a compound with a carbon chain and one or more of the hydrogens replaced with a halogen. Haloalkyl also means compounds wherein all of the hydrogen atoms have been replaced by halogen atoms. Alkylene as used.herein refers to a divalent alkyl moiety.

The term hydrocarbyl as employed herein means any aliphatic, cycloaliphatic, aromatic, aryl-substituted aliphatic or cycloaliphatic, or aliphatic or cycloaliphatic-substituted aromatic groups. The aliphatic groups can be saturated or unsaturated. Likewise, the term hydrocarboxy means a hydrocarbyl group having an oxygen linkage between it and the carbon atom to which it is attached.

The polyepoxides preferably correspond to one of Formulas 6 to 9.

In one embodiment polyepoxides refers to an advanced epoxy resin which is the reaction product of one or more polyepoxides, as described previously, with one or more polyhydroxy hydrocarbons or a halogenated derivative thereof. Such polyhydroxy hydrocarbons have been described previously. Alternatively, a polyepoxide can be reacted with a carboxyl-substituted hydrocarbon. A

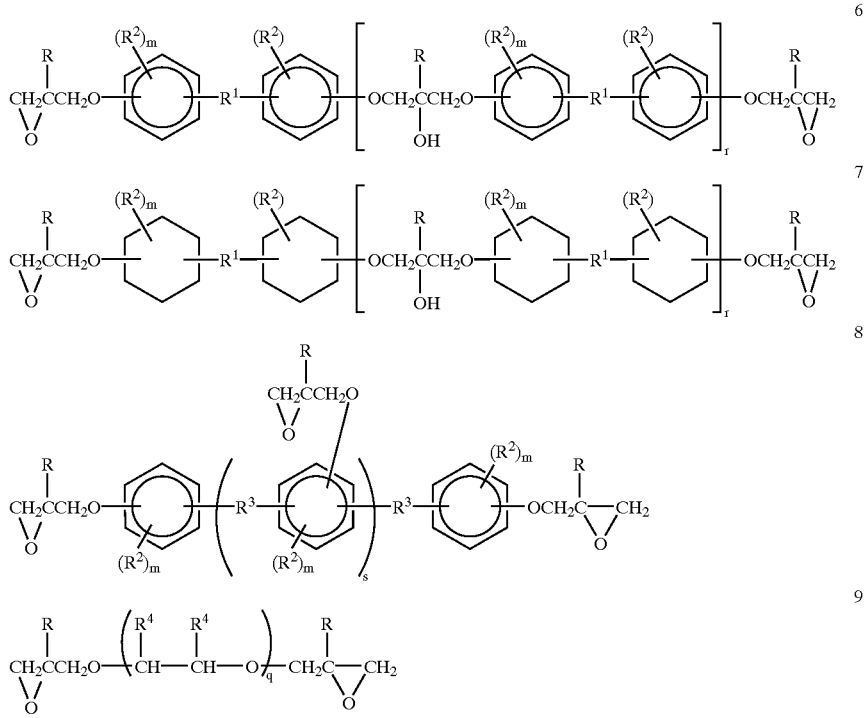

wherein R, $R^1$, $R^2$, $R^3$, $R^4$, m, m', s, and q are as defined previously; r is from 0 to 40, preferably from 0 to 10, more preferably 1 to 5. Preferably, s is from 0 to 8; and most preferably 1 to 4.

Useful epoxide compounds are the glycidyl ethers of compounds having an average of more than one aliphatic hydroxyl group per molecule such as, for example, aliphatic diols, polyether diols, polyether triols, polyether tetrols and any combination thereof. Also useful are the alkylene oxide adducts of compounds containing an average of more than one aromatic hydroxyl group per molecule such as, for example, the ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or any combination thereof.

Preferable epoxy resins include, for example, the diglycidyl ethers of resorcinol, catechol, hydroquinone, biphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl-substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyl-tribromobiphenol, tetrachlorobisphenol A and any combination thereof.

carboxyl-substituted hydrocarbon is a compound with a hydrocarbon backbone and one or more carboxyl moieties, preferably more than one, and most preferably two. Preferably such compounds correspond to Formula 10;

$$R^5\text{—(COOH)}_u \qquad 10$$

wherein R5 is a $C_{1-40}$ hydrocarbyl moiety optionally containing oxygen along the backbone, and u is one or greater. $R^5$ is preferably a $C_{1-40}$ straight- or branched-chain alkane or alkene, optionally containing oxygen. Preferably u is 1 to 4, and most preferably 2. Fatty acids and fatty acid dimers are among the useful carboxylic acid-substituted hydrocarbons. Included in the fatty acids are caproic acid, caprylic acid, capric acid, octanoic acid, versatic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In one preferred embodiment one or more polyhydroxy hydrocarbons or halogenated derivatives thereof and one or more carboxyl-substituted hydrocarbons are reacted with the polyglycidyl ether of a polyhydroxy compound or halogenated derivative thereof. Procedures for performing such a reaction are well known in the art. See "The Handbook of Epoxy Resins" by H. Lee and K. Neville (1967) McGraw Hill, New York, and U.S. Pat. Nos. 2,633,458; 3,477,990; 3,821,243; 3,907,719, 3,975,397; and 4,071,477. Optionally, a small amount of a monohydroxy-substituted hydrocarbon can be included in the reaction mixture.

Cross-linkers useful in this invention are hydroxy-functional compounds having a hydroxyl-functionality of 2.2 or more, dicarboxylic acid anhydrides and copolymers of styrene and hydroxystyrene when used in combination. While not intending to be limited to a particular mechanism, it is understood that the polyhydroxy cross-linkers react with epoxides in the traditional manner described by Lee and Neville, Supra, at pages 5-13 et seq. The presence of an average functionality greater than 2, that is, 2.2 or more causes the polyhydroxy cross-linker to cross-link between chains of epoxy molecules. The dicarboxylic acid anhydride reacts on one hand with a secondary hydroxide formed by the opening of an oxirane ring of a polyepoxide forming an ester linkage at the location of the secondary hydroxide, and forming the carboxylic acid function with the other acid anhydride moiety. The carboxylic acid functionality then is available to react in the traditional manner with an oxirane ring of a separate epoxide (Lee and Neville, page 12-2 et seq.). The anhydride thus forms a cross-linking function between two molecular chains at points in the chain which were formed from the opening of oxirane rings.

The chain extender is described as including dihydroxy phenols. The functionality of two for the chain extender is contrasted with the functionality of greater than two described for the polyhydroxy functional cross-linker.

Examples of preferable cross-linkers include among others, aromatic polyhydroxy-containing compounds as described above, include the polybasic acids and their anhydrides, such as, for example, the di-, tri-, and higher carboxylic acids as oxalic acid, phthalic acid, terphthalic acid, succinic acid, alkyl and alkenyl-substituted succinic acids, tartaric acid, and particularly the polymerized unsaturated acids, such as for example, those containing at least 10 carbon atoms, and preferably more than 14 carbon atoms, as for instance dodecenedioic acid, 10,12-eicosadienedioic acid, and anhydrides such as, phthalic anhydride, succinic anhydride, maleic anhydride, nadic anhydride (bicyclo-[2.2.1]-5 hept-5-en-2,3-dicarboxylic anhydride and its isomers), methyltetrahydrophthalic anhydride, nadic methyl anhydride, methylhexahydrophthalic anhydride, citraconic anhydride, itaconic anhydride, dodecenylsuccinic anhydride, tricarboxylic anhydride, linoleic acid adduct of maleic anhydride, benzophenonetetracarboxylic dianhydride, pyromellitic dianhydride, cyclopentanetetracarboxylic dianhydride polycarboxylic acid anhydrides according to Formulas 12, and 13

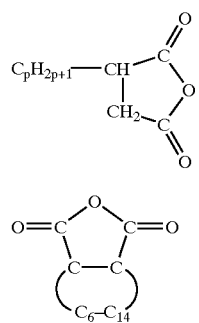

and copolymers of an ethylenically unsaturated anhydride and a vinyl compound, for example: styrene-maleic anhydride copolymer and others, for example, described in WO 95/06075 and also corresponding to Formulas 15 and 16:

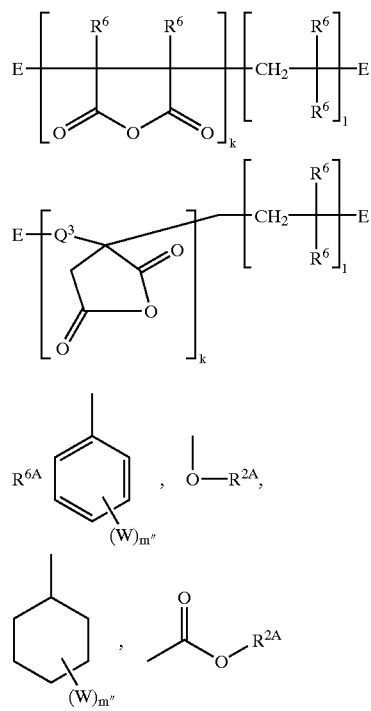

where $R^6$ is hydrogen, a $C_{1-3}$ allyl, or $R^{6A}$;

$Q^3$ is a $C_{1-30}$ carbonyl, or methyl, provided where $Q^3$ is methyl, it may be substituted with the substituents according to $R^{6A}$;

W is —OH, or —COOH;

$R^{2A}$ may be $C_{1-30}$ alkyl, halogen or hydrogen; E and m" are as previously defined.

Copolymers of styrene and maleic anhydride having a molecular weight ($M_w$) in the range of from 1500 to 50,000 and an anhydride content of more than 15 percent are particularly preferred. Commercial examples of these materials include SMA 1000, SMA 2000, and SMA 3000 having styrene-maleic anhydride ratios of 1:1, 2:1, and 3:1 respectively and molecular weight ranging from 6,000 to 15,000, are available from Elf Atochem S.A.

Catalysts useful in this invention are those catalysts which catalyze the reaction of a polyepoxide with a cross-linker, and which remain latent in the presence of the inhibitor at lower temperatures. Preferably the catalyst is latent at temperatures of 140 C or below, and more preferably at 150 C or below. Latency is demonstrated by an increase of at least 10 percent in gel time as determined by a stroke cure test performed at 150 C to 170 C. Examples of preferred catalysts are compounds containing amine, phosphine, heterocyclic nitrogen, ammonium, phosphonium, arsonium or sulfonium moieties. More preferred catalysts are the heterocyclic nitrogen and amine-containing compounds and even more preferred compounds are heterocyclic nitrogen-containing compounds.

As the reactive moieties of the chain-extender compounds, and the cross-linking compounds are frequently the same, a described catalyst may function to catalyze chain extension and chain cross-linking reactions.

Among preferable catalysts are those represented by the following formulas 17 or 18:

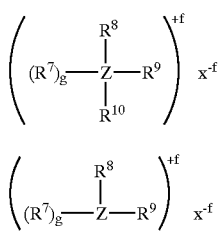

Formula 17

Formula 18 wherein each of $R^7$, $R^8$, $R^9$ and $R^{10}$ is independently a hydrocarbyl group having from 1 to 18, preferably from 1 to 9 carbon atoms, or a hydrocarbyl group having from 1 to 18, preferably from 1 to 9 carbon atoms which group also contains one or more oxygen, sulfur, halogen, or nitrogen atoms, or two of such $R^7$, $R^8$, $R^9$ and $R^{10}$ groups can combine to form a heterocyclic ring containing one or more atoms other than carbon atoms; each X is the anion portion of an acid of a relatively strong nucleophilic acid; Z is phosphorus, nitrogen, sulfur or arsenic; f has a value equal to the valence of the anion X and g has a value of zero or 1 depending on the valence of Z.

Particularly suitable onium or amine compounds useful as catalysts include, for example, ethyltriphenyl phosphonium acetate, ethyltriphenyl phosphonium acetate-acetic acid complex, tetrabutylphosphonium acetate, tetrabutylphosphonium acetate-acetic acid complex, ethyltriphenyl phosphonium chloride, ethyl triphenyl phosphonium iodide, tetrabutylphosphonium chloride, tetrabutylphosphonium iodide, tetrabutylphosphonium hydroxide, tetrabutylammonium hydroxide, tetraethylammonium hydroxide, tetramethylammonium hydroxide, N-methylmorpholine, 2-methylimidazole, triethylamine, N,N,N',N'-tetramethylethylenediamine, ethyltri(2-hydroxyethyl) ammonium hydroxide, ethyltri(2-ethoxyethyl)ammonium hydroxide, triethyl(2-thioethylethyl)ammonium hydroxide, N-methyl-N-methylenemethanaminium acetate, N-methyl-N-methylene-methanaminium acetate-acetic acid complex, N-methyl-N-methylenemethanaminium chloride, N-methyl-N-methylenemethanaminium iodide, N-methylpyridinium acetate, N-methylpyridinium acetate-acetic acid complex, N-methylpyridinium chloride, N-methylpyridinium iodide, 1-ethyl-2,3-dimethylimidazolium acetate, 1-ethyl-2,3-dimethyl-imidazolium acetate-acetic acid complex, 1-ethyl-2,3-dimethylimidazolium chloride, 1-ethyl-2,3-dimethyl-imidazolium iodide, N-methylquinolinium acetate, N-methylquinolinium acetate-acetic acid complex, N-methylquinolinium chloride, N-methylquinolinium iodide, N-methyl-1,3,5-triazinium acetate, N-methyl-1,3,5-triazinium acetate-acetic acid complex, N-methyl-1,3,5-triazinium chloride, N-methyl-1,3,5-triazinium iodide and any combination thereof.

The amine compounds useful as catalysts which can be suitably employed herein include, for example, primary, secondary, tertiary, aliphatic, cycloaliphatic, aromatic or heterocyclic amines.

Preferable non-heterocyclic amines which can be employed herein include, those containing suitably from 1 to 60, more suitably from 2 to 27, most suitably from 2 to 18, carbon atoms. Particularly preferable amines include, for example, ethylamine, diethylamine, triethylamine, n-propylamine, di-n-propylamine, tri-n-propylamine, isopropylamine, diisopropylamine, triisopropylamine, butylamine, dibutylamine, tributylamine methyldibutylamine, and combinations thereof.

Variances are observed among amine catalysts. The Examples 6, 12, 14, and 16 demonstrate a wide variation of $T_g$ and gel time.

Among preferred tertiary amines that may be used as catalysts are those mono- or polyamines having an open-chain or cyclic structure which have all of the amine hydrogen replaced by suitable substituents, such as, hydrocarbon radicals, and preferably aliphatic, cycloaliphatic or aromatic radicals. Examples of these amines include, among others, methyl diethanolamine, triethylamine, tributylamine, dimethyl benzylamine, triphenylamine, tricyclohexyl amine, pyridine and quinoline. Preferred amines are the trialkyl, tricycloalkyl and triaryl amines, such as triethylamine, triphenylamine, tri(2,3-dimethylcyclohexyl)amine, and the alkyl dialkanolamines, such as methyl diethanolamines and the trialkanolamines such as triethanolamine. Also useful are 1,5-diazabicyclo[4.3.0]non-5-en, 1,4-diazabicyclo[2.2.2] octane, and 1,8-diazabicyclo[5.4.0]undec-7-en(1,5-5).

Especially preferred for catalyzation of the reaction between polyepoxides and hydroxy-containing cross-linkers are tertiary amine accelerators such as benzyldimethylamine, tris-(dimethylaminomethyl) phenol and imidazole compounds.

Preferable are the adducts of any aliphatic, cycloaliphatic, aromatic or heterocyclic secondary amine compounds and an epoxy resin having an average of more than one vicinal epoxide group per molecule, such as, for example, an adduct of 2-methylimidazole and the diglycidyl ether of bisphenol A. These adducts can easily be prepared by reacting the secondary amine compound with the epoxy resin at a temperature of from 25 C to 50 C, preferably from 60 C to 125 C, more preferably from 80 C to 100 C. The secondary amine compound and the epoxy resin are employed in amounts which provide a ratio of moles of secondary amine compound per epoxide group of from 1:1 to 5:1, preferably from 1:1 to 3:1, more preferably from 1:1 to 1.5:1. The adducts can be prepared in the presence of any suitable solvent such as, for example, alcohols, ethers, glycol ethers and ketones.

Examples of heterocyclic nitrogen compounds useful herein include those described in U.S. Pat. No. 4,925,901.

Preferable heterocyclic secondary and tertiary amines or nitrogen-containing compounds which can be employed herein include, for example, imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines and combinations thereof.

Among a more preferred class of heterocyclic nitrogen-containing compounds useful as catalysts are those possessing in the heterocyclic ring (1) a substituted C=N—C group and (2) a secondary amino group, including the imidazoles, such as the substituted imidazoles and benzimidazoles according to Formulas 19 and 20:

19

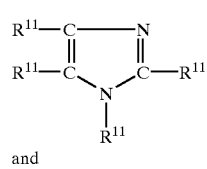

and

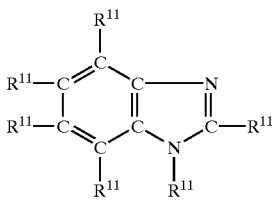

respectively, wherein $R^{11}$ is independently in each occurrence selected from hydrogen atoms, halogen atoms, or an organic radical, such as, a hydrocarbon radical or a substituted hydrocarbon radical, for example, the ester, ether, amide, imide, amino, halogen, or mercapto-substituted $C_1$–$C_5$ hydrocarbon radicals. Alternatively, two adjacent $R^{11}$ can combine to form a 5- or 6-membered ring. Especially preferred imidazoles are those wherein $R^{11}$ is a hydrogen or hydrocarbon radical and preferably an alkyl, alkenyl, cycloalkyl, cycloalkenyl, aryl, alkaryl or arylalkyl radicals, and particularly those containing no more than 15 carbon atoms.

A more detailed description of the chemistry of the imidazoles and benzimidazoles including their properties and structural formulas is found in the book by Klaus Hofmann entitled "Imidazole and Its Derivates" published by Interscience Publishers., Inc., New York (1953). Examples of imidazoles include, among others, imidazole, benzimidazole and substituted examples. Preferable substituted imidazoles include: 1-methylimidazole; 2-methyl imidazole; 2-ethylimidazole, 2-propylimidazole, 2-butylimidazole, 2-pentylimidazole, 2-hexylimidazole, 2-cyclohexylimidazole, 2-phenylimidazole, 2-nonylimidazole, 2-undecylimidazole, 2-heptadecylimidazole, 2-phenyl-4-methylimidazole, 1-benzylimidazole, 1-ethyl-2-methylbenzimidazole, 2-methyl-5,6-benzimidazole, 1-vinylimidazole, 1-allyl-2-methylimidazole, 2-cyanoimidazole, 2-chloroimidazole, 2-bromoimidazole, 1-(2-hydroxypropyl)-2-methylimidazole, 2-phenyl-4,5-dimethylolimidazole, 2-phenyl-4-methyl-5-hydroxymethylimidazole, 2-chloromethylbenzimidazole, 2-hydroxybenzimidazole, 2-ethyl-4-methylimidazole; 2-cyclohexyl-4-methylimidazoles; 4-butyl-5-ethylimidazole; 2-butoxy-4-allylimidazole; 2-carboethyoxybutylimidazole, 4-methylimidazole; 2-octyl-4-hexylimidazole; 2-methyl-5-ethylimidazole; 2-ethyl-4-(2-ethylamino)imidazole; 2-methyl-4-mercaptoethylimidazole; 2,5-chloro-4-ethylimidazole; and mixtures thereof. Especially preferred are the alkyl-substituted imidazoles; 2,5-chloro-4-ethylimidazole; and phenyl-substituted imidazoles, and mixtures thereof. Even more preferred are 2-methylimidazole; 2-ethyl-4-methylimidazole; 1,2-dimethylimidazole; 2-phenylimidazole; and 1-methylimidazole.

The reaction inhibitor is boric acid, Lewis acids containing boron such as alkyl borate, alkyl borane, trimethoxyboroxine, an acid having a weak nucleophilic anion, such as, perchloric acid, tetrafluoroboric acid, and organic acids having a pKa from 1 to 3, such as, salicylic acid, oxalic acid and maleic acid. Boric acid as used herein refers to boric acid or derivatives thereof, including metaboric acid and boric anhydride, combinations of a Lewis acid with boron salts such as: alkyl borate, or trimethoxyboroxine. Boric acid is preferred over maleic acid and salicylic acid. At constant levels of catalyst, increasing amounts of inhibitors will yield corresponding increase in the gel time.

The inhibitor and catalysts may be separately added to the compositions of this invention, or may be added as a complex. The complex is formed by contacting and intimately mixing a solution of the inhibitor with a solution of the catalyst. Optionally, an acid having a weak nucleophilic anion may be present. The contact time required to form the complex depends on the solvent selected and temperature. Such contacting generally is performed at ambient temperature, although other temperatures may be used, for example, temperatures of from 0 C to 100 C, more preferably from 20 C to 60 C. The combination of temperature and solvent selected generally permits formation of the complex in 1 to 120 minutes, preferably within 10 to 60 minutes. The solvents used for each component are preferably miscible. Most preferably the same solvent is used. Preferred solvents for the catalyst and the inhibitor are polar solvents. Lower alcohols having from 1 to 20 carbon atoms provide good solubility and volatility for removal from the resin matrix when prepregs are formed with methanol most preferred. Alternatively, the components of the complex may be contacted neat, in the absence of solvent and reacted as described.

Polar solvents are particularly useful to dissolve inhibitors of boric acid or Lewis acids derived from boron. If the polar solvents are hydroxy-containing, there exists a potential competition for available carboxylic acid anhydride between the hydroxy moiety of the solvent and the secondary hydroxyl formed on opening of the oxirane ring. Thus, polar solvents which do not contain hydroxyl moieties are useful, for example, N-methyl-2-pyrrolidone, dimethylsulfoxide, dimethylformamide, and tetrahydrofuran. Also useful are dihydroxy and trihydroxy hydrocarbons optionally containing ether moieties or glycol ethers having two or three hydroxyl groups. Preferred are $C_{2-4}$ di- or trihydroxy compounds, for example: 1,2-propane diol, ethylene glycol and glycerine. The polyhydroxy-functionality of the solvent facilitates the solvent serving as a chain extender, or cross-linker according to the possible mechanism previously described concerning cross-linkers.

The amount of the inhibitor present relative to the catalyst in the composition can be adjusted to adjust the gel time of the epoxy resin composition. At a desired catalyst level, the relative amount of inhibitor can be decreased to decrease the gel time. To increase the gel time the amount of inhibitor can be increased without changing the catalyst level.

Alternately, the catalytic products of the present invention can be prepared in situ in the presence of the epoxy resin by adding each component to the epoxy resin in any order under essentially the same conditions as mentioned above.

The molar ratio of inhibitor (or mixture of different inhibitors) to catalyst is that ratio which is sufficient to significantly inhibit the reaction of the polyepoxide or advanced epoxy resin as exhibited by an increase in gel time as compared to a like composition free of inhibitor. Simple experimentation can determine the particular levels of inhibitor or mixtures which will increase in gel time but still allow a complete cure at elevated temperatures. A preferable molar ratio range of inhibitor, and optional acid with a weak nucleophilic anion, or other Lewis Acids, to catalyst where up to 5.0 phr of boric acid is used, is from 0.1:1.0 to 4.0:1.0, with a more preferred range being from 0.4:1.0 to 3.0:1.0, with an even more preferred range of 0.7:1.0 to 1.5:1.0.

The most preferred ratios depend upon which onium or amine compound is mixed with the boric acid, or the particular mixture of boric acid, acid having a weak nucleophilic anion, and Lewis acids, for example, the preferred ratio of moles of.boric acid or mixture of boric acid, or its analogues, Lewis acid having a weak nucleophilic anion, acids such as alkyl borate, alkyl borane, trimethoxyboroxine, an acid having a weak nucleophilic anion, such as perchloric acid, tetrafluoboric acid, and other acids such as salicylic acid, oxalic acid and maleic acid per mole of imidazole compound is from 0.6:1 to 1.5:1, while the most preferred ratio is in the range of from 0.75:1 to 1.4:1. For phosphonium compounds, the preferred ratio for the boric acid or analog compound or Lewis Acid is from 0.8:1 to 1.35:1, more preferably from 1.1:1 to 1.25:1 moles of acid per mole of phosphonium compound. For other catalysts, routine reactivity experiments can determine the optimum ratios of boric acid to onium or amine compound by mixing the components together in various ratios and conducting simple, routine experiments.

When a mixture of boric acid, optionally a Lewis acid, and an acid having a weak nucleophilic anion are employed, they are employed in an amount which provides a ratio of moles of boric acid to moles of acid having a weak nucleophilic anion of from 0.1:1 to 0.9:1, preferably from 0.2:1 to 0.8:1, more preferably from 0.3:1 to 0.7:1.

The catalytic products of the present invention can be employed alone or in combination with other catalysts. Suitable catalytic products result from reacting the onium or amine compounds or a combination thereof with an inorganic acid containing a weak nucleophile. By the term "weak nucleophile" or "weak nucleophilic", it is meant that the material has a nucleophilicity value "n" of greater than zero and less than 2.5 by the method described by C. G. Swain and C. B. Scott in J. Am. Chem. Society, Vol. 75, p 141 (1953).

Organic acids having a pKa value from 1 to 3 also give good results in combination with catalytic products. Typical examples include salicylic acid, oxalic acid, and maleic acid, and mixtures thereof.

Preferable inorganic acids having a weak nucleophilic anion or weak nucleophile include, for example, fluoroboric acid, fluoroarsenic acid, fluoroantimonic acid, fluorophosphoric acid, chloroboric acid, chloroarsenic acid, chloroantimonic acid, chlorophosphoric acid, perchloric acid, chloric acid, bromic acid, iodic acid and any combination thereof. The most preferable is fluoroboric acid.

In one embodiment, the diepoxide, dihydroxy hydrocarbon or halogenated dihydroxy hydrocarbon and inhibitor can be contacted prior to the addition of the cross-linker and catalyst. Those polyfunctional dihydroxyhydrocarbons or halogenated dihydroxy hydrocarbons useful are well-known in the art see for example, Lee and Neville, supra; and U.S. Pat. No. 4,594,291, at column 8, lines 24 to 36.

Concentrations of components used to describe in this invention are measured as parts by weight of components per hundred parts of resin by weight (phr), unless otherwise noted. Such hundred parts of resin refers specifically to the polyepoxide included in the composition. The amount of cross-linker which may be present may vary depending upon the particular cross-linker used. In the case of an polyepoxide resin cross-linker of the copolymer of an ethylenically unsaturated anhydride and a vinyl compound type, for example: styrene-maleic anhydride copolymer amounts of cross-linker are from 30 to 150 parts of cross-linker per hundred parts of resin, by weight, more preferably from 35 to 130; and most preferably from 40 to 110 parts. An aromatic hydroxyl-containing compound cross-linker may be employed in amounts which provide a ratio of aromatic hydroxyl groups to epoxy groups preferably from 0.05:1 to 20:1, more preferably from 0.1:1 to 10:1, most preferably from 0.2:1 to 5:1. When both hydroxyl-containing compounds and acid anhydrides are used together, the molar ratio of epoxy groups to the sum of the anhydride groups and hydroxyl groups may be employed.

The catalysts are employed in a sufficient amount to result in a substantially complete cure of the epoxy resin, with some cross-linking. Preferably the catalyst is used in an amount of from 0.01 to 5 parts per hundred parts of resin, with from 0.05 to 2.0 parts per hundred parts of resin being more preferred and from 0.1 to 1.5 catalyst per hundred parts of resin being most preferred. Alternatively, the quantity of catalyst is stated in millimoles per epoxy equivalent preferably from 0.05 to 100, more preferably from 0.1 to 50, even more preferably from 0.5 to 20, most preferably from 1 to 10 millimoles of catalyst per epoxide equivalent.

The compositions of this invention can be used to coat any article for which a coating is desired. Such article can be coated, with the composition, and the coating can be partially cured or fully cured. In that the embodiment where the coating is partially cured, the article may be further processed such that the partially cured resin may be finally cured. The article coated can be any substrate, for example metal, cement and reinforcing material. In a preferred embodiment the article is a fibrous reinforcing material for composites or laminates.

The reinforcing material which may be coated with the compositions of this invention include any material which would be used by the skilled artisan in formation of composites, prepregs and laminates. Examples of the forms of such materials are cloth, mesh, web, or fibers. Preferably, such materials are made from glass fibers, paper, plastics such as aromatic polyamides and graphite. Preferred materials include glass or fiberglass, in cloth or web form. Other additives may also be present including fillers, dyes, pigments, surfactants and flow control agents.

Compositions containing polyepoxide, cross-linker, catalyst and inhibitor, may be contacted with an article used in any method known to those skilled in the art. Examples of such contacting methods include powder-coating, spray-coating, and contacting the article with a bath containing the composition. In a-preferred embodiment, the article is contacted with the composition in a bath. Preferably the bath contains from 40 to 90 percent solids. In such a bath, the various components of the epoxy resin compositions are dissolved or suspended in the bath. A single solvent or solvent blend may be used for the bath, but in many applications a separate solvent is used for each component added to the mixture. It is preferable that the various solvents used be miscible with one another. Such solvents or diluents, include those which are volatile and escape from the composition prior to cure. Preferred solvents for the epoxy resins are ketones, including acetone and methyl ethyl ketone. Preferred solvents for the cross-linkers are slightly polar solvents, amides, for example, dimethylformamide, ether alcohols, for example, methyl, ethyl, propyl or butyl ethers of ethylene glycol, ketones of methyl, ethyl, propyl or butyl, dipropylene glycol, ethylene glycol monomethylether, 1 methoxy-2-propanol, toluene, xylene methoxypropyl acetate, 2-ethoxyethyl acetate, and mixtures of solvents. The catalysts and inhibitors are preferably dissolved in polar solvents, in particular alcohols, preferably lower alkanols and most preferably methanol. Where the inhibitor is liquid or has high solubility in non-polar solvents, ketones may be used.

In one embodiment, the invention is a process for preparing prepregs from the resin composition and the reinforcing material. Such process comprises contacting the reinforcing material with an intimately mixed bath comprising: a polyepoxide in a solvent; a cross-linker for the polyepoxide in a solvent; an inhibitor such as boric acid in a polar solvent; and a compound which catalyzes the curing of the polyepoxide with the cross-linker in a polar solvent. The coating occurs under condition such that the reinforcing material is coated with epoxy resin, cross-linker, inhibitor, and catalyst. Thereafter the coated reinforcing materials are passed through a heated zone at a temperature sufficient to cause the solvents to evaporate, but below the temperature which the polyepoxide undergoes significant cure during the residence time in the heated zone. The reinforcing material preferably has a residence time in the bath of from 0.1 minute to 10 minutes, more preferably from 0.3 minute to 8 minutes, and most preferably from 0.5 minute to 3 minutes. The temperature of such bath is preferably from 0 C to 100 C, more preferably from 10 C to 40 C and most preferably from 15 C to 30 C. The residence time of the coated reinforcing material in the heated zone is from 0.5 minute to 15 minutes, more preferably from 1 minute to 10 minutes and most preferably from 1.5 minutes to 5 minutes. The temperature of the heated zone is sufficient to cause any solvents remaining to volatilize away, yet, not so high as to result in a complete curing of the components. Preferable temperatures of such heated zone are from 80 C to 230 C, more preferably from 100 C to 200 C, and most preferably from 140 C to 170 C. Preferably, there is some means in the heated zone to remove the volatile solvent, either by passing an inert gas through the oven, or drawing a slight vacuum on the oven. In many embodiments the coated materials are exposed to zones of increasing temperature. The first zones are designed to cause the solvent to volatilize so it can be removed. The later zones are designed to result in partial cure of the polyepoxide, that is, so called B-staging. Neat or low solvent epoxy resin formulations will necessarily exhibit a higher viscosity, however, such formulations of epoxy resin, cross-linker, catalyst, and inhibitor may be fabricated to articles by steps including hot-melting and injection.

In some embodiments, the manufacture of the coated article may be interrupted at this B-stage, for further processing, or alternatively the material may be further processed immediately after solvent removal. In such further processing, whether immediately, or after an interruption, several segments or parts of the coated reinforcing material are brought in contact with one another. Thereafter, the contacted parts are exposed to elevated pressures and temperatures sufficient to cause the epoxy resin to cure wherein the resin on adjacent parts react to form a continuous epoxy resin matrix between and about the fibrous reinforcing material. Before being cured, the parts may be cut and stacked or folded and stacked into a part of desired shape and thickness. The pressures used may be anywhere from 10 to 2000 newtons/cm$^2$, with from 100 to 1000 newtons/cm$^2$ being preferred. The temperature used to cure the resin in the parts or laminates, depends upon the particular residence time, pressure used, and resin used. Preferred temperature which may be used are from 100 C to 240 C, more preferably from 120 C to 200 C, and most preferably from 160 C to 180 C. The residence times may be anywhere from 30 minutes to 300 minutes, more preferably from 45 to 200 minutes, and most preferably from 60 minutes to 180 minutes. One embodiment of such a process is known as a continuous process. In such process, the reinforcing material is taken from the oven and appropriately arranged into the desired shape and thickness and pressed at very high temperatures for short times, in particular such high temperatures are from 180 C to 250 C, more preferably 190 C to 210 C, at times of 1 to 10 minutes.

In some embodiments, it is desirable to subject the laminate or final product to a post-cure outside of the press. This step is designed to complete the curing reaction. The post-cure is usually performed at a temperature of from 130 C to 220 C for at a time of from 20 minutes to 200 minutes. This post-cure step may be performed in a vacuum to remove any components which may volatilize.

The ultimate coated-reinforced parts prepared from the composition of this invention, when cured, often demonstrate a higher $T_g$ than where the compositions not within the scope of this invention are used. In some embodiments the $T_g$ is at least 5 C higher than parts prepared similarly using conventional resins formulated to give similar gel times (hence similar reactivity). The laminates prepared using the composition of this invention, demonstrate a higher solvent resistance, for example, demonstrate a pick-up of less than 1.0 percent N-methyl pyrrolidone in test method conditions.

Furthermore such parts exhibit a higher thermal performance as there is little or no entrapment of the solvents for the polyepoxide, the catalyst, the cross-linker, or the inhibitor. The formulations of this invention preferably exhibit longer gel times as compared to polyepoxide compositions of the prior art.

It is understood by those skilled in the art that in the preparation of the compounds described mixtures of compounds result. Consequently, the values for variables of repeating units of the compounds described such as g, m, m', s, t, m", k, l, r, u, and p, are average values.

The following examples are presented to illustrate the invention and are not intended to limit the scope of the invention. Unless otherwise stated all parts and percentages are by weight.

Comparative Example 1

A varnish composition was prepared from the components according to Table I. The brominated epoxy resin employed was a reaction product of the diglycidyl ether of bisphenol A and tetrabromobisphenol A having an EEW from 420 to 450 and a bromine content of 19 to 21 percent. Commercially, such a brominated epoxy resin is available from The Dow Chemical Company as D.E.R.™ 537EK80. The brominated epoxy resin was dissolved in methyl ethyl ketone (MEK) solvent and subsequently mixed with dicyandiamide and 2-methylimidazole solutions over a period of 30 minutes at ambient temperature. Additional MEK is added in order that the varnish has a solution viscosity of 100 to 250 mPa·sec measured with a Brookfield Viscometer.

TABLE I

| Component (pbw) | Comparative Example 1 | Comparative Example 2 | Example 3 |
|---|---|---|---|
| Resin components | | | |
| brominated epoxy resin (EEW 420–450) | 100.00 pbw | 40 pbw | |
| tetrabromobisphenol A | | 5 pbw | 17.5 pbw |
| diglycidyl ether of bisphenol A | | | 23.5 pbw |
| diglycidyl ether of tetrabromobisphenol A (EEW 430 to 470, Br content from 46 to 52%) | | 13 pbw | 18.0 pbw |
| methyl ethyl ketone (MEK) | 25.00 pbw | 14.5 pbw | 2.4 pbw |
| methoxypropylacetate | | | 7 pbw |
| hardener | | | |
| styrene-maleic anhydride copolymer Mol. wt 3000 | | 32 pbw | 41 pbw |
| MEK | | 32 pbw | 41 pbw |
| dicyandiamide (8% in methyl glycol solution) | 3.2 pbw | | |

TABLE I-continued

| Component (pbw) | Comparative Example 1 | Comparative Example 2 | Example 3 |
|---|---|---|---|
| catalyst | | | |
| 2-methyl imidazole (10% solution in methanol) | 0.08 pbw imidazole | 0.02 pbw imidazole | — |
| 2-ethyl-4-methylimidazole (2E4MI) | — | — | 0.05 pbw |
| boric acid | — | — | 0.04 pbw |
| Triganox-C ™ | — | 0.20 pbw | — |
| methanol | — | — | 1.0 pbw |
| Additional components to form resin varnish | | | |
| methyl ethyl ketone | 5 pbw | — | — |
| a pre-polymer of triallyl cyanurate (70% dissolved in methyl ethyl ketone) | — | 14.3 pbw solution | — |
| methoxypropyl-acetate | — | — | 2 pbw |

Comparative Example 2

A varnish was prepared according to the composition of Table I. Firstly, brominated epoxy resin was dissolved into MEK and followed by the diglycidyl ether of tetrabromobisphenol A (having an EEW from 430 to 470 and a bromine content of 46 to 52 percent, available from The Dow Chemical Company as Quatrex™ 6410) and tetrabromobisphenol A by stirring the solution for 60 minutes at 23° C. Secondly, a pre-solution of the styrene-maleic anhydride copolymer and the indicated MEK was blended together with a pre-polymer of triallyl cyanurate (with a number average molecule weight of 10,000 and Mw of 150,000) available from Akzo Chemicals B.V., 2-methyl imidazole and Triganox-C™ components. Thereafter this pre-solution was added to the epoxy resin solution.

A styrene-maleic anhydride copolymer having a molecular weight of about 10,000 is available from Elf Atochem S.A. as SMA 3000.

Triganox-C™ is a peroxide catalyst (t-butyl peroxy perbenzoate) commercially available from Akzo Chemicals B.V.

Example 3

A varnish composition was prepared according to the components of Table I and as with Comparative Example 2, a two-component procedure was employed. First, an epoxy resin solution was prepared, by heating under nitrogen gas, the diglycidyl ether of bisphenol A, the diglycidyl ether of tetrabromobisphenol A and tetrabromobisphenol A to 130° C. for 60 minutes until a homogeneous mixture was obtained using a convention reactor kettle. The mixture was then cooled to 120° C. followed by the addition of propylmethoxy acetate and further cooled to 85° C. for the addition of MEK and subsequent cooling to 23° C. Secondly, a solution of styrene-maleic anhydride copolymer was prepared by heating the indicated MEK solvent to 70° C. in a reactor kettle under nitrogen atmosphere and adding the styrene-maleic anhydride copolymer gradually over a period of at least 1 hour until completely dissolved. The two separate solutions were then added together with a pre-mixture of the catalyst components (boric acid and 2-ethyl-4-methyl imidazole) held in methanol solvent. The complete varnish solution was gently stirred at 23° C. for 30 minutes before use to prepare circuit board laminates. The evaluation results appear in Table II.

TABLE II

| | Comparative Example 1 | Comparative Example 2 | Example 3 |
|---|---|---|---|
| Varnish Reactivity at 170° C., IPC Test Method TM-650 Number 5.1.410 | 220 seconds | 200 seconds | 165 seconds |
| Use of resin varnish for impregnation of glass fiber webs composed of E-glass in a 7628 style woven fabric available from Porocher S.A., 69008 Lyon, FRANCE. | | | |
| Oven temperature | 175° C. | 165° C. | 165° C. |
| minutes in Oven | 2.73/2.4/2.15 | 4.29/3.75/3.33 | 2.73/2.5/2.31 |
| Properties of impregnated Glass Fibers | | | |
| Appearance | smooth, glossy | lumpy | smooth glossy |
| Resin content | 42.5 ± 0.5% | 42.5 ± 0.5% | 42.5 ± 0.5% |
| Resin gel time - seconds @ 170° C. | 60/90/120 | 5/30/60 | 11/27/45 |
| FLOW, IPC method TM-650 Number 2.3.17 | 12/18/22 | 0/17/24 | 13/16/21 |
| Lamination of 8 layers of the varnish impregnated glass fabric (prepregs) | | | |
| Lamination Pressure 13.8 bar (200 psi) constant, temperature cycle | 90 minutes @ 175° C. | 90 minutes @ 175° C. | 90 minutes @ 175° C. |
| $D_k$ | 4.7 | 4.30 | 4.25 |
| $D_f$ | 0.025 | 0.011 | 0.009 |
| Copper Adhesion - | 20 N/cm | 13 N/cm | 13 N/cm |
| $T_{dA}$ ° C. | 319 | 355 | 360 |
| % NMP adsorption | 0.45 | 0.09 | 0.09 |
| $T_g$ (° C.) | 130 | 157 | 175 |

TABLE II-continued

|  | Comparative Example 1 | Comparative Example 2 | Example 3 |
|---|---|---|---|
| Further post-lamination pressurized heating |  |  |  |
| 13.8 bar constant pressure applied | — | 120 minutes @ 200° C. | 120 minutes @ 200° C. |
| $T_g$ (° C.) | — | 175 | 184 |

$T_{dA}$ onset of thermal decomposition in air.
$D_k$ dielectric constant measured at 1 MHz and 23° C.
$D_f$ dissipation factor measured at 1 MHz and 23° C.
Copper Adhesion - Circuit foils, NTTWS, 35µ grade by IPC method TM-650 Number 2.4.8C.
$D_k$ & $D_f$ measured by IPC method TM-650 Number 2.5.5.1B.
NMP adsorption - adsorption of N-methyl pyrrolidone solvent measured by IPC method TM-650 Number 2.3.4.2
IPC The Institute for Interconnection and Packaging Electronic Circuits, 3451 Church Street, Evanston, Illinois 60203 UNITED STATES.

Examples 4 and 5

Epoxy resin, hardener, and catalyst were combined in the manner of Example 3 according to the composition and portions of Table III.

TABLE III

| Component - parts by weight | Example 4 | Example 5 |
|---|---|---|
| Epoxy Resin Component |  |  |
| diglycidyl ether of bisphenol A | 20.6 | — |
| diglycidyl ether of bisphenol F | — | 20.6 |
| diglycidyl ether of tetrabromobisphenol A | 20.6 | 20.6 |
| Hardener Component |  |  |
| tetrabromobisphenol A | 14.7 | 14.7 |
| methoxypropyl acetate | 6.6 | 6.6 |
| methyl ethyl ketone | 3.3 | 3.3 |
| styrene-maleic anhydride copolymer, mol. wt 10,000 | 44 | 44 |
| methoxypropyl acetate | 22 | 22 |
| methyl ethyl ketone | 22 | 22 |
| Catalyst Components |  |  |
| boric acid | 0.04 | 0.04 |
| 2-ethyl-4-methylimidazole (2E4MI) | 0.05 | 0.05 |
| methanol | 1 | 1 |
| Observed Properties |  |  |
| Glass Transition Temperature ($T_g$) After Cure Cycle: 90 min. @ 175° C. | 177° C. | 173° C. |
| $T_g$ - Cure Cycle: 90 min. @ 200° C. | 186° C. | 179° C. |
| $D_t$ @ 1MHz 23° C. | 0.010 | 0.010 |
| Cu Foil Adhesion Circuit Foil NTTW at 23° C. (N/cm) | 11.3 | 12.7 |
| Cu Foil Adhesion Circuit Foil NTTWS at 23° C. (N/cm) | 13.9 | 13.7 |
| IPC Blister Test (IPC TM650, 2.6.16) | 3 hours pass | 3 hours pass |
| Flammability Rating (UL-94 test) | V-0 | V-0 |

Examples 6 Through 17

Epoxy resin, hardener, and catalyst were combined in the manner of Example 3 according to the following composition and portions:
Resin Components:
  diglycidyl ether of Bisphenol F, EEW 165 to 175—20.6 parts by weight (pbw);
  diglycidyl ether of tetrabromobisphenol A having an EEW from 430 to 470 and a bromine content of 46 to 52 percent—20.6 pbw;
  tetrabromobisphenol A—14.7 pbw;
  methoxypropyl acetate—6.6 pbw; and
  methyl ethyl ketone—3.3 pbw.

Hardener Components:
  Styrene-maleic anhydride copolymer, mol. weight 10,000—44 pbw;
  methyl ethyl ketone—22 pbw; and
  methoxypropyl acetate—22 pbw. Catalyst and Inhibitor Components as indicated:

TABLE IV

| Example number | Catalyst type/portion (pbw solids) | Inhibitor type/portion (pbw solids) | Gel time @ 170° C., sec | $T_g$, ° C., after curing: 10 min @ 150° C. and 90 min @ 175° C. |
|---|---|---|---|---|
| 6* | 2E4MI/0.05 | —/— | 158 | 170 |
| 7 | 2E4MI/0.05 | Oxalic acid/0.04 | 182 | 178 |
| 8 | 2E4MI/0.05 | Maleic acid/0.04 | 169 | 165 |
| 9 | 2E4MI/0.05 | HBF4/0.02 Boric acid/0.02 | 224 | 166 |
| 10 | 2E4MI/0.08 | HBF4/0.04 | 200 | 170 |
| 11 | 2E4MI/0.10 | Perchloric acid/0.04 | 171 | 162 |
| 12* | Morpholine/1.2 | —/— | 202 | 150 |
| 13 | Morpholine/1.2 | Boric acid 0.04 | 213 | 148 |
| 14* | DMP-30/0.08 | —/— | 219 | 111 |
| 15 | DMP-30/0.08 | Boric acid/0.04 | 249 | 116 |
| 16* | BDMA/0.1 | —/— | 213 | 112 |
| 17 | BDMA 0.1 | Boric acid/0.04 | 267 | 116 |

*not examples of the invention claimed.
2E4MI = 2-ethyl-4-methylimidazole.
BDMA = Benzyldimethylamine.
DMP-30 = Tris(dimethylaminomethyl)phenol.

The influence of catalyst and inhibitor on the $T_g$ the gel time is apparent.

What is claimed is:

1. An epoxy resin composition comprising
   a) a polyepoxide,
   b) a complex of a catalyst and a cure inhibitor, wherein the cure inhibitor is selected from the group consisting of boric acid, a Lewis acid derivative of boron, an alkyl borane, a mineral acid having a nucleophilicity value "n" of greater than zero and less than 2.5, an organic acid having a pKa value of 1 or more, but not more than 3, and a mixture of two or more therefore wherein the molar ratio of the inhibitor to the catalyst is from 0.1:1.0 to 4.0:1.0 such that the gel time of the resin can be controllably adjusted to extend the gel time of the resin and the catalyst amount is sufficient to result in a substantially complete cure of the resin, and c) from 40 parts to 150 parts of at least one cross-linker per 100 parts of polyepoxide, wherein the cross-linker includes a copolymer of an ethylenically unsaturated anhydride and a vinyl compound.

2. The epoxy resin according to claim 1 including d) a solvent.

3. The epoxy resin composition according to claim 1 which also comprises a bifunctional chain extension compound.

4. The epoxy resin composition according to claim 3 wherein the bifunctional chain extension compound is bisphenol A, or tetrabromobisphenol A.

5. The epoxy resin composition according to claim 1, wherein the catalyst is a heterocyclic nitrogen compound, an amine, a phosphine, an ammonium compound, a phosphonium compound, an arsonium compound, or a sulfonium compound.

6. The epoxy resin composition according to claim 5, wherein the catalyst is an imidazole of Formula 19, or a benzimidazole of Formula 20

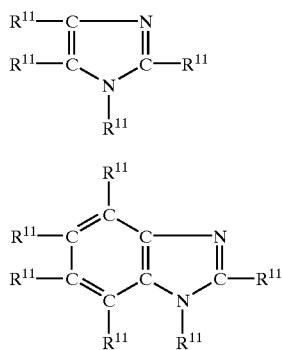

wherein each $R^{11}$ independently is hydrogen, halogen, or an organic radical.

7. The epoxy resin composition according to claim 6, wherein at least one $R^{11}$ is a hydrocarbyl radical or a substituted hydrocarbyl radical.

8. The epoxy resin composition according to claim 7, wherein each $R^{11}$ independently is a $C_1$–$C_5$ hydrocarbyl radical substituted with an ester, ether, amide, imide, amino, halogen, or mercapto group.

9. The epoxy resin composition according to claim 1, wherein the cross-linker is a polyanhydride containing units of the formula

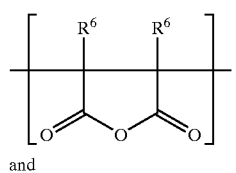
and

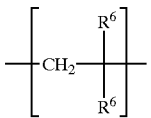

or units of the formula

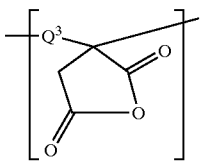

and

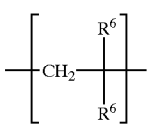

where the ratio of k to l units is from 1:1 to 50:1, the total number of monomer units k and l is from 3 to 10,000, $R^6$ is hydrogen, $C_{1-3}$ allyl, or $R^{6A}$;

$R^{6A}$ is:

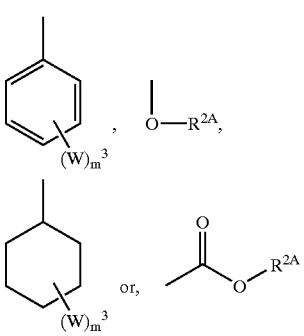

$Q^3$ is $C_{1-30}$ carbonyl, or methylene optionally substituted with one or two substituents of Formula $R^{6A}$;

W is —OH, or —COOH;

m" is from 0 to 5; and $R^{2A}$ is from $C_{1-30}$ alkyl, halogen or hydrogen.

10. An epoxy resin composition according to claim 1 having a dielectric constant of 4.30, or less.

11. An epoxy resin composition according to claim 1 having a dielectric dissipation factor of less than 0.010.

12. The epoxy resin composition of claim 1 wherein the cross-linker is a copolymer of styrene and maleic anhydride.

* * * * *